Figure 1:
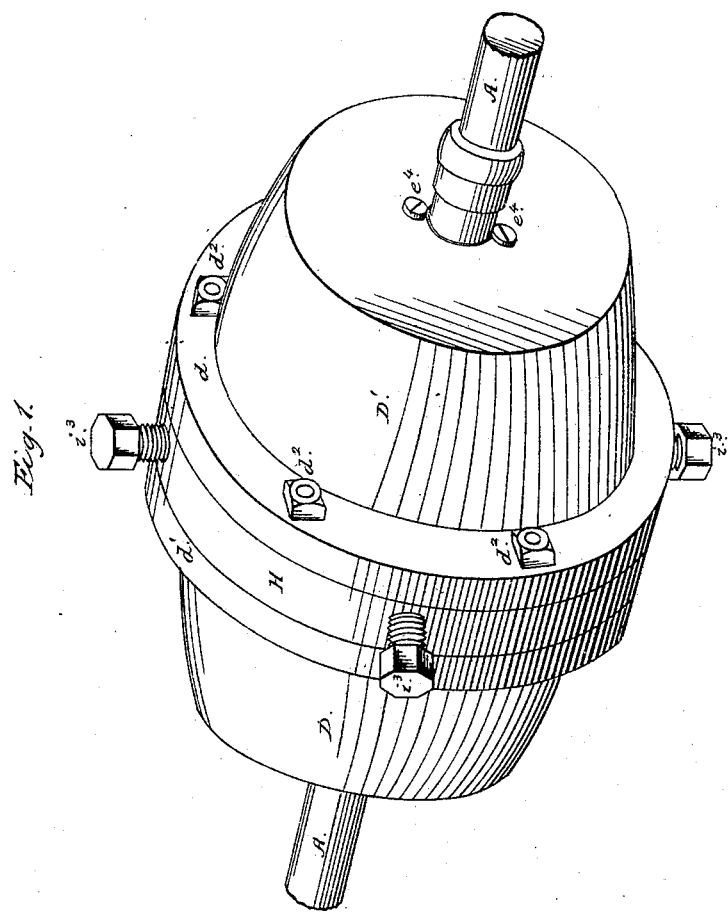

(Model.)

G. R. WINKLER.
ROCKING PISTON ENGINE.

No. 277,648. Patented May 15, 1883.

Attest:
C. W. Howard
H. W. Seely

Inventor:
Gustavus R. Winkler
by Dyro Wilber
Att'ys.

N. PETERS, Photo-Lithographer, Washington, D. C.

(Model.)
4 Sheets—Sheet 2.
G. R. WINKLER.
ROCKING PISTON ENGINE.
No. 277,648. Patented May 15, 1883.
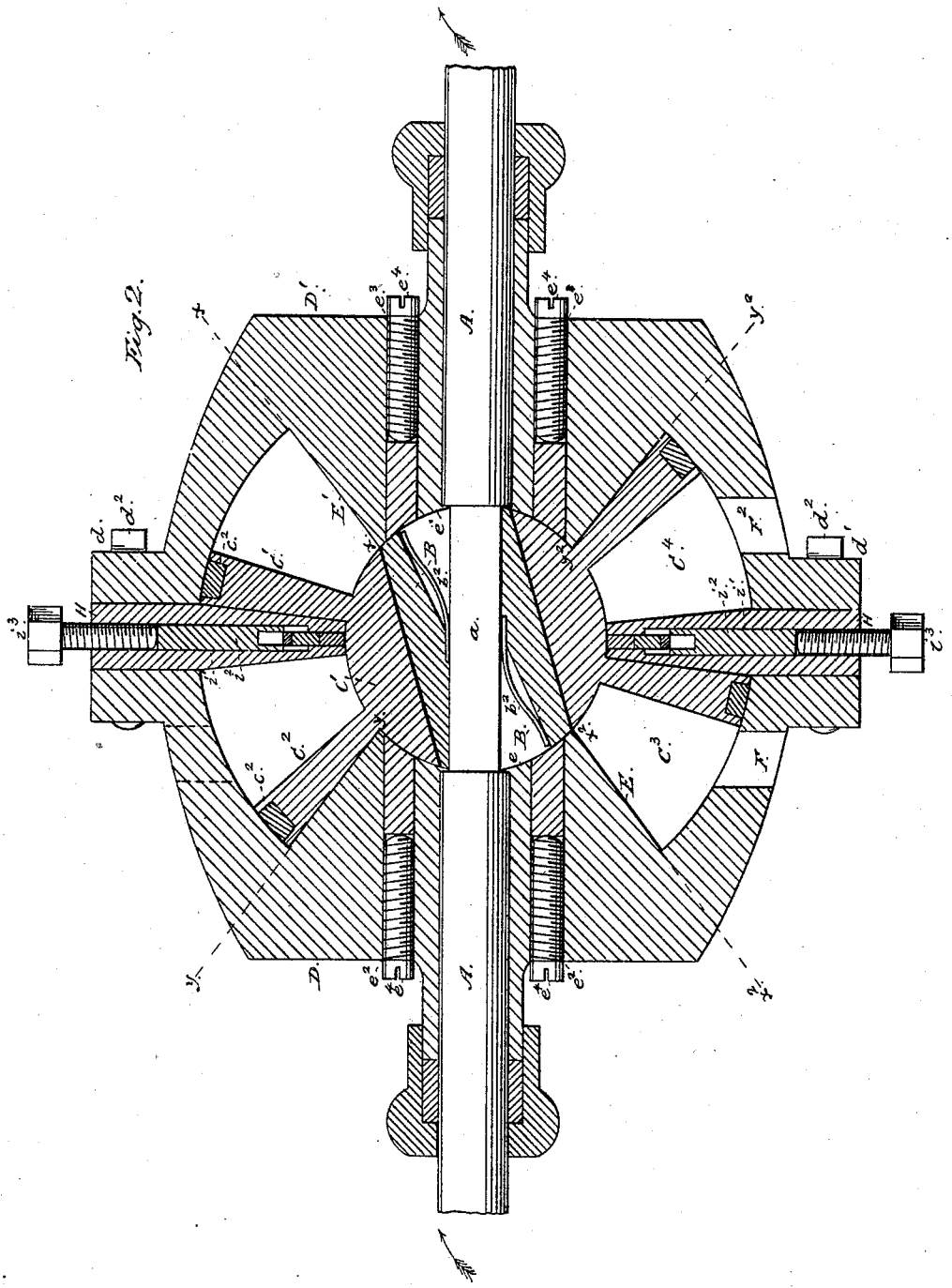
Attest:
C. W. Howard
H. W. Seely
Inventor:
Gustavus R. Winkler
by Dyer & Wilber
Attys (Model.)

G. R. WINKLER.
ROCKING PISTON ENGINE.

No. 277,648. Patented May 15, 1883.

4 Sheets—Sheet 3.

Attest:
F. W. Howard
H. W. Seely

Inventor:
Gustavus R. Winkler
by Dyer & Wilber
Atty

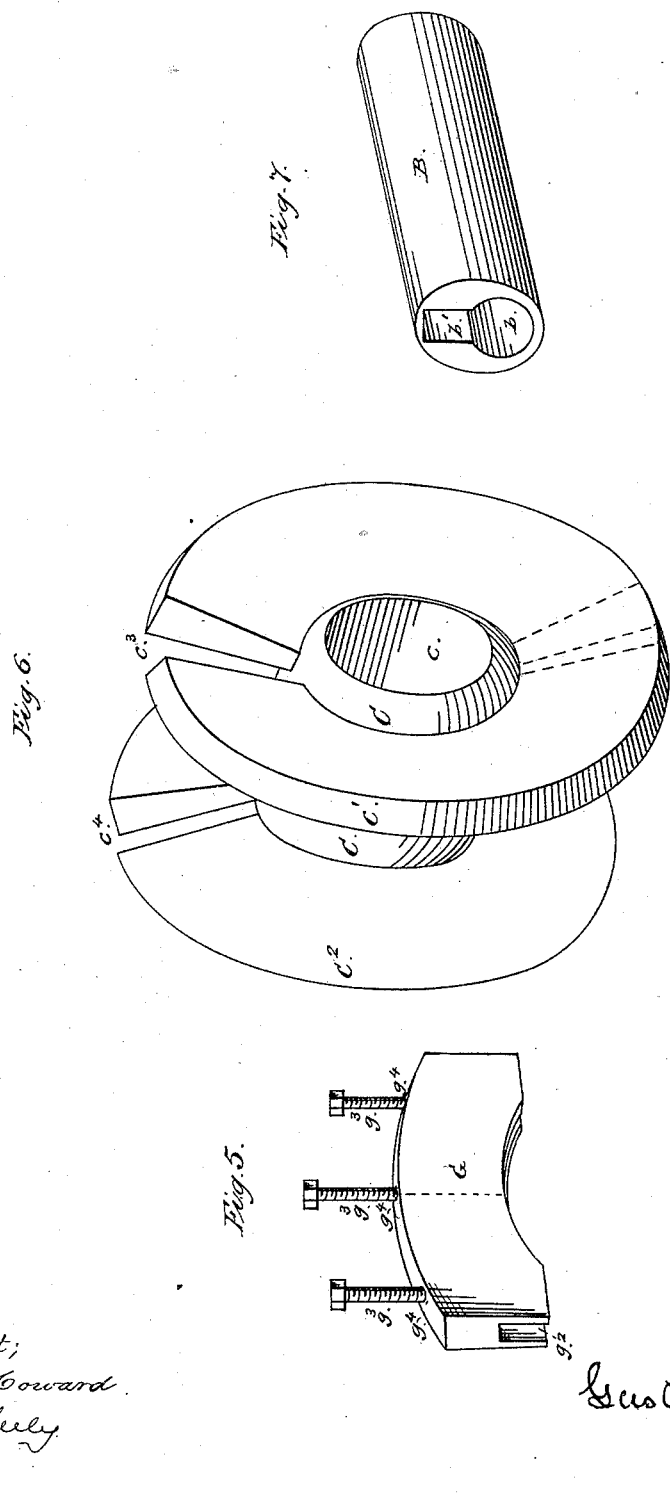

UNITED STATES PATENT OFFICE.

GUSTAVUS R. WINKLER, OF WILLIAMSPORT, PENNSYLVANIA.

ROCKING PISTON-ENGINE.

SPECIFICATION forming part of Letters Patent No. 277,648, dated May 15, 1883.

Application filed October 16, 1880. Renewed September 18, 1882. (Model.)

*To all whom it may concern:*

Be it known that I, GUSTAVUS R. WINKLER, of Williamsport, in the county of Lycoming and State of Pennsylvania, have invented a new and useful Improvement in Rocking Piston-Engines; and I do hereby declare that the following is a full and exact description of the same, reference being had to the accompanying drawings, and to the letters of reference marked thereon.

My invention relates to the construction and operation of rocking piston-engines, my object being to produce a machine without any dead-center or any approximate thereto; without any reversal movement requiring an extra expenditure of power to arrest momentum and recreate it again; without any interruption in the flow of the fluids pumped or of the motor forces used; without any appreciable centrifugal forces to be considered in determining its speed; without any concussion, jar, or pulsation; without any strain on its foundation-fastenings other than from belts connecting it with other machinery; without any concussive strain on pump or pipes; without any valves requiring an extra expenditure of power to work them or to cause wastage by their operation; without any air-chamber, or need of one, to equalize flow from the pump; without any flywheel, or need of one, with its inertia to overcome; to use any motor force of a fluid or similar nature—as steam, compressed air, water, gas, &c.—and to pump and force water, air, gas, and other fluids in an uninterrupted stream; to be equally effective at all imaginary points in its circuit and to utilize all the expansive power of its motor forces; to safely attain any velocity within the point of abrasion of its journals; to have the forces at work within it so adjusted that the friction of its few working parts will be reduced to a mere minimum, and almost the full effectiveness of the motor forces be secured; to run noiseless; to be very compact and simple in its construction and operation; to be economical in its use of forces; to effect a saving in cost of construction, repairs, and running expenses through the natural results of above-named points gained in this machine, which reduces the power required for self-operation to a mere minimum of the great power acquired through its great uninterrupted attainable velocity—a machine that can be separately used as an engine or pump, in which case it would be double-acting, or as a combined engine and pump, in which latter case each would be single-acting, the disk of the pump working in unison with that of the engine, and both making their respective strokes at each revolution of the shaft upon which they are mounted; and the invention therein consists in the novel construction and arrangement of the disks and their connecting-ball and the means by which the same are operated; in the peculiar construction and arrangement of the eccentric crank for retaining the ball and disks in proper position; in the combination of the disks with their chambers and ports of peculiar construction; in the novel form of said chambers; in the combination of each disk with its respective chambers and ports peculiarly arranged therein; in the peculiarly-constructed diaphragm and partition, separating, respectively, the disk-chambers and their ports; and, further, in the various combinations of the above-mentioned parts and devices, and the manner of connecting two or more of the machines, and the peculiar changes made in the relative size of the engine and pump chambers of each additional machine and of one machine with another, all as more fully hereinafter explained.

To enable those skilled in the art to make and use my invention, I now proceed to describe the same, having reference to the accompanying drawings, in which—

Figure 4:
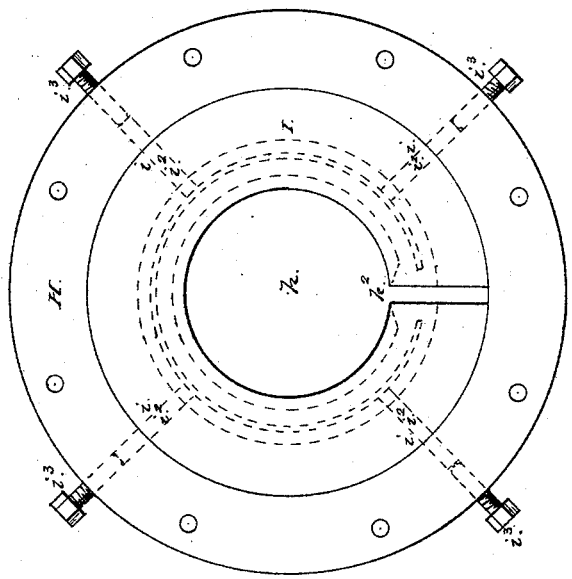
Figure 3:
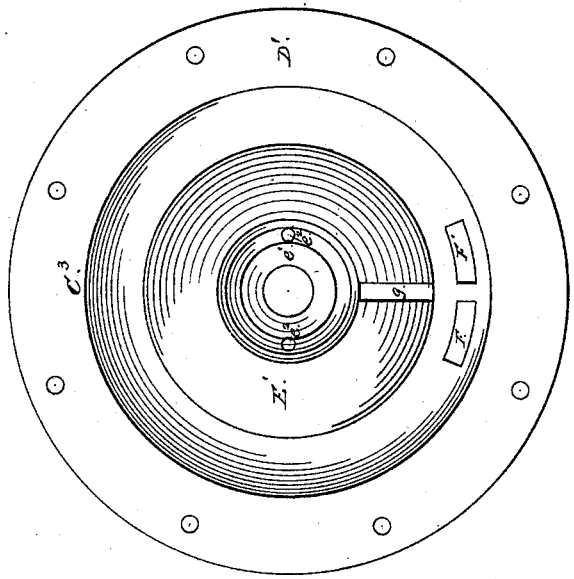

Figure 1 is an elevation of my combined engine and pump, partly in perspective; Fig. 2, a vertical section of the same on the line of the driving-shaft; Fig. 3, a plan view of the interior of one of the disk-chambers; Fig. 4, a plan view of the diaphragm arranged between and separating said chambers; Fig. 5, a plan view of the partition separating the ports, respectively, of each chamber; Fig. 6, a perspective view of the disks and the ball connecting them solidly together, and Fig. 7 a perspective view of the eccentric crank for keeping the disks and their connecting-ball in proper position during stroke.

Like letters denote corresponding parts in each figure.

For the sake of clearness and brevity I will use the words "steam," "water," instead of rehearsing the motor forces or the pumping-fluids for which the machine is adaptable.

In the drawings, A represents the driving-shaft of my combined engine and pump. For some distance each way from its center this shaft has its surface at $a$ squared to receive an eccentric crank, B. This crank is cylindrical in form, with slightly-rounded ends, and has a circular opening, $b$, of the diameter of the shaft, passing diagonally through its length in one direction for the purpose of slipping said crank into position thereon, and also a square-sided opening, $b'$, of the diameter of the squared place of the shaft, passing diagonally through its length in an opposite direction for the purpose of steadying the crank when in position.

I would not confine myself to the above arrangement for slipping the shaft into position, as it might be effected equally well by making the squared part of the shaft equal or greater in diameter to the balance of the shaft; or the crank may be cast in two parts and fastened together after being put in position on the shaft. Outwardly-extending leaf-springs $b^2$, fastened to the center of the shaft on opposite sides, press away the ends of the crank therefrom, and hold the same in such a position as to always have the plane of its revolution at an angle to that of the driving shaft.

C is a ball having a diameter equal to the length of the eccentric crank B, and provided with a central circular opening, $c$, in which said eccentric revolves, its outer ends being rounded to make a continuation of the surface of the inclosing-ball. This ball carries one, two, or three circular disks, though the drawings show but two, and the arrangements for one or three disks will naturally suggest themselves from the description of the two disks $C'$ $C^2$, cast thereon at the proper distance apart in parallel planes at right angles to central opening, $c$, the faces, respectively, of each disk being parallel and inclined outwardly, so as to have a gradually-enlarging space between the disks from their points of contact with the ball to their outer edges or perimeters. The periphery of each disk is beveled to conform to the inclined sides of the chambers $C^3$ $C^4$, inclosing the same, hereinafter to be described, and has a central slot or recess, $c^2$, cut therein to receive suitable packing, so that the disks may fit their respective chambers with a greater nicety, and if a plane be taken diagonally through each disk-chamber the packing in the disk's periphery will press closely against all points in the sides of the chamber lying in said plane. From this description it will readily be seen that the diameter of each disk plus the diameter of the ball where the disk is joined thereto should be nearly, if not quite, equal to the diameter of a plane passing diagonally through its respective chamber.

The shell of the machine, which forms the sides and abutment-heads, respectively, of each disk-chamber, is preferably made in two parts, D D', having external flanges, $d$ $d'$, by means of which and the bolts $d^2$ they are secured together. These two parts are similar in construction, each being in form the section of a hollow sphere, cast in one piece, with inwardly-extending abutment-heads E E', of the shape of a frustum of a cone, with their inner faces spherically depressed, so as to provide suitable chambers, $e$ $e'$, for the rounded ends of the eccentric to work in when the two parts of the shell are secured in proper position on the shaft. This shaft passes centrally through said parts and their abutment-heads, where it turns in proper journal-bearings, the outside surfaces of said abutment-heads lying in parallel planes and at right angles to such shaft. Holes $e^2$ $e^3$ are bored through the abutment-heads from their outer surfaces to the spherical chambers $e$ $e'$, in which the eccentric works. A suitable cavity for packing is made around the edge and within the sperical chambers in the abutment-heads, and, being filled with suitable packing, is held to its work by means of screws $c^4$. In the sides, respectively, of each disk-chamber are formed two ports, (inlet and outlet,) F F' F² F³.

If it is desired to use my machine as an engine or pump separately, the ports in the one chamber must be diagonally opposite those in the other, as shown in Fig. 2 by the dotted lines; but if used as engine and pump combined they then should be on the same side of the shell, as shown in Fig. 3, the inlet and outlet ports of each chamber being separated by a partition, G. This partition extends from the outer curved periphery of the shell, to which it is properly secured by means of bolts, radially inward with inclined sides until it meets the ball connecting the disks, its inner face at that point being curved to conform to the shape of such ball, while its parallel ends fit closely into slots $g$ $g'$ in the inclined faces of the abutment-heads, and divide, respectively, each disk-chamber. The sides of the inner half of this partition are cast hollow to form a packing-space, $g^2$, where its inner face comes in contact with the surface of the ball. This space is to be nearly filled with suitable packing, which is held well to its work by means of set-screws $g^3$, pressing against it at several points through holes $g^4$, bored into such packing-space from the outer surface of the partition.

When I wish to use my machine as an engine or pump separately I provide it with two partitions—that is to say, I divide G in two equal parts, as shown by dotted lines in Fig. 5, and locate one half between the inlet and outlet ports of one chamber, and the other half between the inlet and outlet ports diagonally opposite of the other chamber.

The disks C C' are slotted at one point, as at $c^3$ $c^4$, to slip over the partition, thus preventing the disks and ball from revolving, but allowing them to oscillate within their respective chambers. These slots are on the same sides of the disks in my combined engine and pump; but when I wish to use the machine separately as an engine or pump, then the slot in one disk comes diagonally opposite the slot in the other disk, as shown by dotted lines in Fig. 6. The slots cut in the disks are a little the widest at their outer ends and have their sides outwardly beveled.

H represents the diaphragm, placed between and forming the inner heads, respectively, of the disk-chambers, and it is in form a section of a solid sphere with slightly-concaved sides, having a central circular opening, $h$, to correspond with the curvilinear shape of the ball between the disks, upon which it closely fits. A slot, $h^2$, is cut through the diaphragm from its outer surface to the central opening at a certain point to allow of its slipping over the partition which separates the ports in the disk-chambers already described. At that part of the diaphragm bounding the central opening, $h$, its sides are cast hollow to form a suitable packing-space, I, for adjusting packing to the surface of the ball at the points where it presses against it. Radial holes $l$ are bored through the diaphragm from its outer surface to such hollow space, and, by means of pins $l^2$ and set-bolts $l^3$, the packing therein properly adjusted to the ball. I prefer to pack this hollow space in the following way: A suitable metal packing is placed therein next to the surface of the ball. Upon this is placed a filling of rubber, and upon this rubber filling is placed a narrow metal strip, leaving a small space between it and the solid part of the diaphragm bounding such space. The bolts $l^3$ press upon the outer ends of the pins $l^2$, moving in their radial holes $l$, and cause their inner ends to pass through such narrow space and in turn press against this metal strip, which in turn compresses the rubber filling, and thus holds the interior metal packing yieldingly to its work. A little above the packing-space I, and extending to near the outer edge of the diaphragm, is another hollow space, through which I may pass the exhaust-steam for the purpose of preventing the radiation of heat from the steam-chamber into the water-chamber, which otherwise would lead to condensation of the steam and loss of power; or by filling the space with dead-air only, prevent the steam from condensing; or by filling the space with a non-conducting material accomplish the same result, in which case said material might extend to the packing above mentioned.

The diaphragm is secured in position on the shaft by the bolts that hold the two parts of the shell together, its outer surface being flush with the flanges cast thereon. The shell of the machine may be supported in any suitable frame. The disks, in making stroke in their respective chambers, are always kept in planes parallel to one another, taken diagonally from any point where the diaphragm touches the sides of such chambers to the farthest point on the inclined surface of their abutment-heads diametrically opposite—that is to say, while the outer face of one disk is pressing against the inclined surface of its abutment-head, and its inner face diametrically opposite pressing against the diaphragm, the outer face of the other disk diagonally opposite is pressing against the inclined surface of its abutment-head, and its diametrically-opposite inner face pressing against the diaphragm. As the shaft is rotated the eccentric crank revolves with it, and by the aid of the partition over which the disks are slipped causes such disks to oscillate within their respective chambers in parallel diagonal planes, as heretofore described, the edges of the slots cut in each disk alternately pressing against and moving along the sides of such partition, and thus automatically opening and closing the inlet and outlet ports, respectively, of each chamber. From this description it will be seen that if the shaft A be rotated by power in the direction shown by arrows, the disks $C'$ $C^2$ will oscillate within their respective chambers $C^3$ $C^4$, and the eccentric crank B will cause the outer face of $C'$ to press against the inclined surface of abutment-head E on the line $x$ $x$, and its inner face to press against the diaphragm on the line $x^2$ $x^2$, while at the same time the outer face of $C^2$ is being pressed against the inclined surface of abutment-head $E'$ on the line $y$ $y$, and its inner face against the diaphragm on the line $y^2$ $y^2$, the lines of contact, respectively, of each disk with its chamber always being in the same straight line progressively around said chamber, so that there will be a constantly-opening space behind the line of contact, and a constantly closing or decreasing space in front of the line of contact on each side.

When I desire to use my machine as a combined engine and pump I employ one chamber, as $C^3$, for a steam-chamber, and the other, as $C^4$, for the pump-chamber, the inlet and outlet ports F F' for steam, and their corresponding ports, $F^2$ $F^3$, for the inlet and outlet of the water, connecting these latter-named ports with suitable suction and force pipes, the suction-pipe being connected with the water-supply. The live steam enters its chamber, presses upon the face of the disk on that side of the partition, and, advancing along on such face, exhausts through the port on the other side of such partition. At the moment the steam begins to exhaust and the beveled side of the slot in the disk is passing the inlet-port the live steam presses upon the opposite face of the disk, and, advancing along such face, exhausts as before. Thus the steam enters the chamber and exhausts therefrom in a continuous manner, alternately pressing upon one face and then upon the other of the disk, thus causing the same to oscillate and turn the shaft. By this means the disk of the pump-chamber is oscillated and the water forced therethrough, and in its passage alternately passed along one face and then the other of such disk. By this arrangement one half of my machine is made an engine working against the other half, the pump; and if we call the engine positive in all its actions, then in its actions the pump is negative, and the result in refrence to friction of the driving-shaft from side or diagonal pressure is zero, the disk being always suspended, as it were, between steam and water. The whole force of the steam is therefore directly applied, minus the friction of packing, so that one hundred pounds steam-pressure produces from ninety-three to ninety-six pounds pressure on the water. The packing of the whole machine is very effective. Should any small obstacle get between the faces of the disks and the inclined surface of the abutment-heads or diaphragm, the eccentric would move upon the springs $b^2$ and allow the disk to pass over the obstruction.

Although I have shown the steam and pump chambers and their corresponding disks as the same in size, I do not wish to confine myself to that construction, for a pump of smaller or larger dimensions than the engine could be used therewith, and preferably under certain circumstances. Also, again, under certain circumstances it would be preferable to have three disks in the combined engine and pump, and in both separately, and so, also, a single disk when used separately, the necessary changes therefor naturally suggesting themselves from the above description.

For the purpose of utilizing all the expansive power of the motor forces, as a matter of economy therein, to gain power and to gain requisite space where it is insufficient in height, duplicate machines are mounted on the same driving-shaft or on separate shafts, the second engine being larger than the first to receive its partly-expanded motor force freely, and the third larger than the second, and so on, the outlets of the first being connected by a suitable pipe with the inlets of the second, and so on. The pumps, if used in combination or separately, may be all of one size, and connected or not; but if used as an air-compressor, or to force to a great height or with great velocity or force, they are connected with pipes same as shown, except reversed in size, the chambers being smaller in the second than in the first, and in the third than in the second, and so on.

Having thus described my invention, what I claim as new therein, and desire to secure by Letters Patent, is—

1. In a rocking piston-engine, the disks $C'$ $C^2$ of circular form, with parallel sides, and united solidly by a ball, C, substantially as described and shown.

2. In a rocking piston-engine, the ball C, provided with circular opening $c$, and carrying two or more or less circular disks, $C'$ $C^2$, substantially as described, and for the purpose set forth.

3. In a rocking piston-engine, the cylindrical-formed eccentric B, having rounded ends, and provided with openings $b\ b'$, substantially as described, and for the purpose set forth.

4. In a rocking piston-engine, the shell divided into two parts, D D', having inwardly-extending abutment-heads E E', of the shape of the frustum of a cone, with inner faces, $e$ $e'$, spherically depressed, and a suitable packing-space near the outer edge of such spherical depression, the several parts constructed and arranged substantially as described, and for the purposes set forth.

5. In a rocking piston-engine, the diaphragm H, slotted as described, and having a central opening, $c$, and a suitable packing-space around such opening, substantially as described, and for the purpose set forth.

6. In a combined rocking piston-engine, the partition G, when constructed and arranged therein substantially as described and shown.

7. In a rocking piston-engine, the squared portion $a$ of the driving-shaft, in combination with the eccentric crank B and springs $b^2$, the several parts constructed, arranged, and operating substantially as described.

8. In a rocking piston-engine, the combination of the disks $C'$ $C^2$ and their connecting-ball C, and the eccentric crank B for operating the same, substantially as described.

9. In a rocking piston-engine, the combination of the chambers $e$ $e'$ of the abutment-heads E E' with the eccentric crank B, substantially as described and shown.

10. In a rocking piston-engine, the combination of chambers $C^2$ $C^3$, constructed as described, and provided with ports F F' and $F^2$ $F^3$, peculiarly arranged therein, diaphragm H, separating such chambers, and partition G, separating the ports, respectively, of each chamber, substantially as described, and for the purposes set forth.

11. In a rocking piston-engine, the combination, with the disks $C'$ $C^2$ and their connecting-ball, of the eccentric B for operating the same, and the partition G for controlling their motion, substantially as and for the purposes set forth.

12. In a rocking piston-engine, in combination, the driving-shaft A, eccentric B, disks $C'$ $C^2$, with their connecting-ball C, chambers $C^3$ $C^4$, partition G, and diaphragm H, all constructed and arranged substantially as and for the purposes set forth.

13. In a rocking piston-engine, the combination of the disks $C'$ $C^2$, disk-chambers $C^3$ $C^4$, and the ports F F' and $F^2$ $F^3$, adapted, respectively, to admit and exhaust steam and receive and force water continuously and alternately upon each face of each respective disk for the purpose of balancing the same, substantially as set forth.

14. In a rocking piston-engine, the combination of the disks $C'$ $C^2$, slotted as described, partition G, and ports F F' and $F^2$ $F^3$, whereby said ports are automatically opened and closed, substantially as described.

This specification signed and witnessed this 16th day of October, 1880.

GUSTAV R. WINKLER.

Witnesses:
JOHN C. SCHROEDER,
M. J. CLAGETT.